Jan. 10, 1967 W. KASTEN 3,297,161
WATER DISCHARGE DEVICE FOR A FUEL FILTER WATER SEPARATOR
Filed Jan. 13, 1964 2 Sheets-Sheet 2
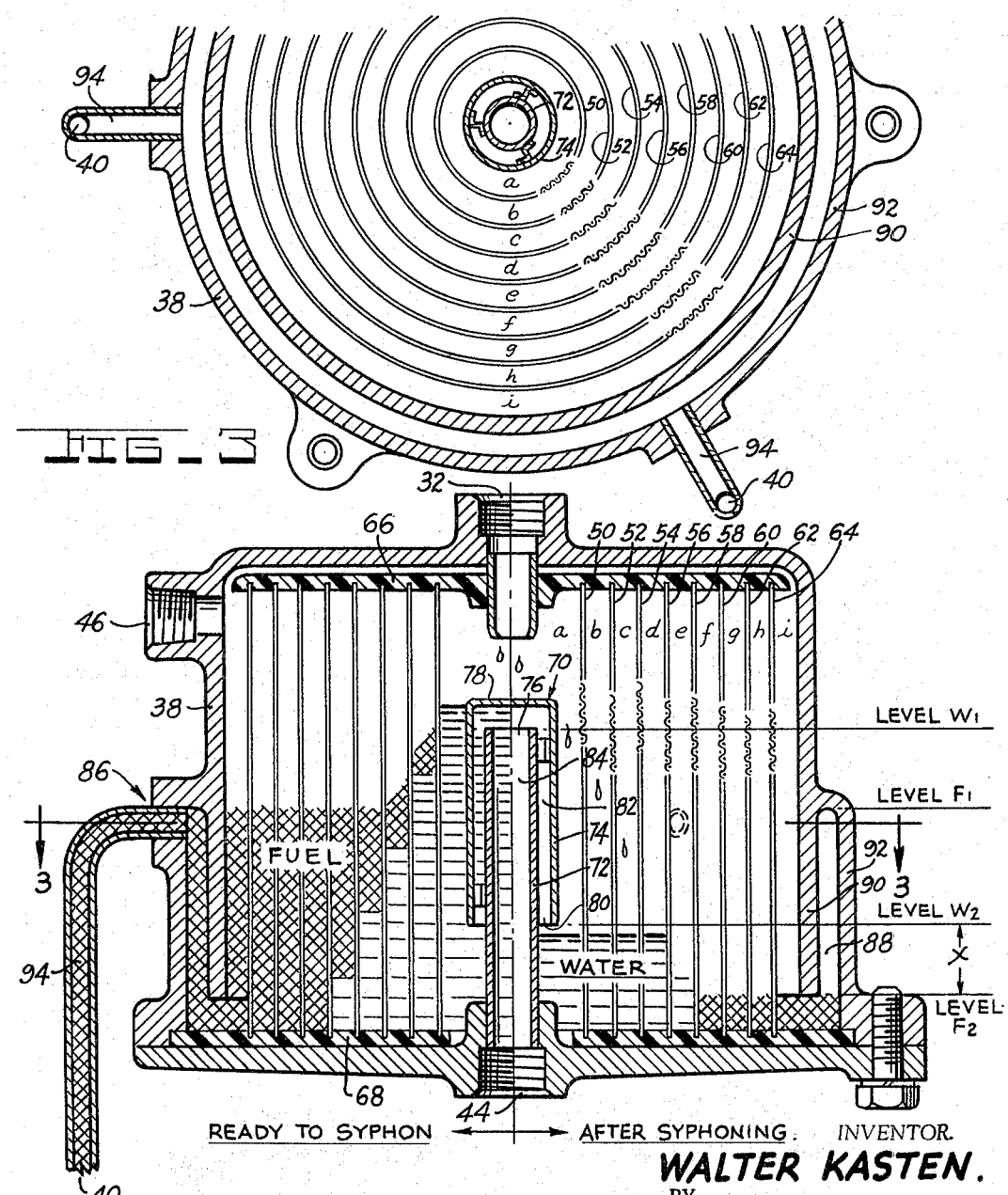
INVENTOR.
WALTER KASTEN.
BY
*William N Antonis*
ATTORNEY United States Patent Office 3,297,161
Patented Jan. 10, 1967

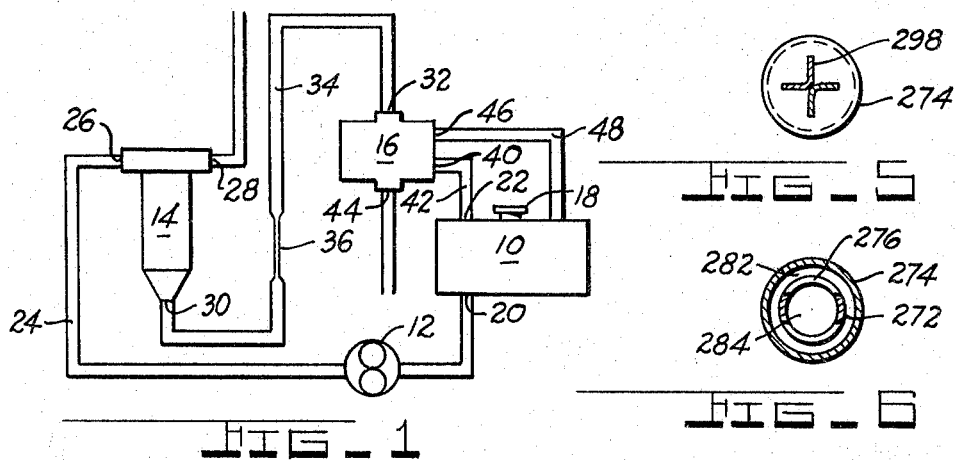
FIG_1
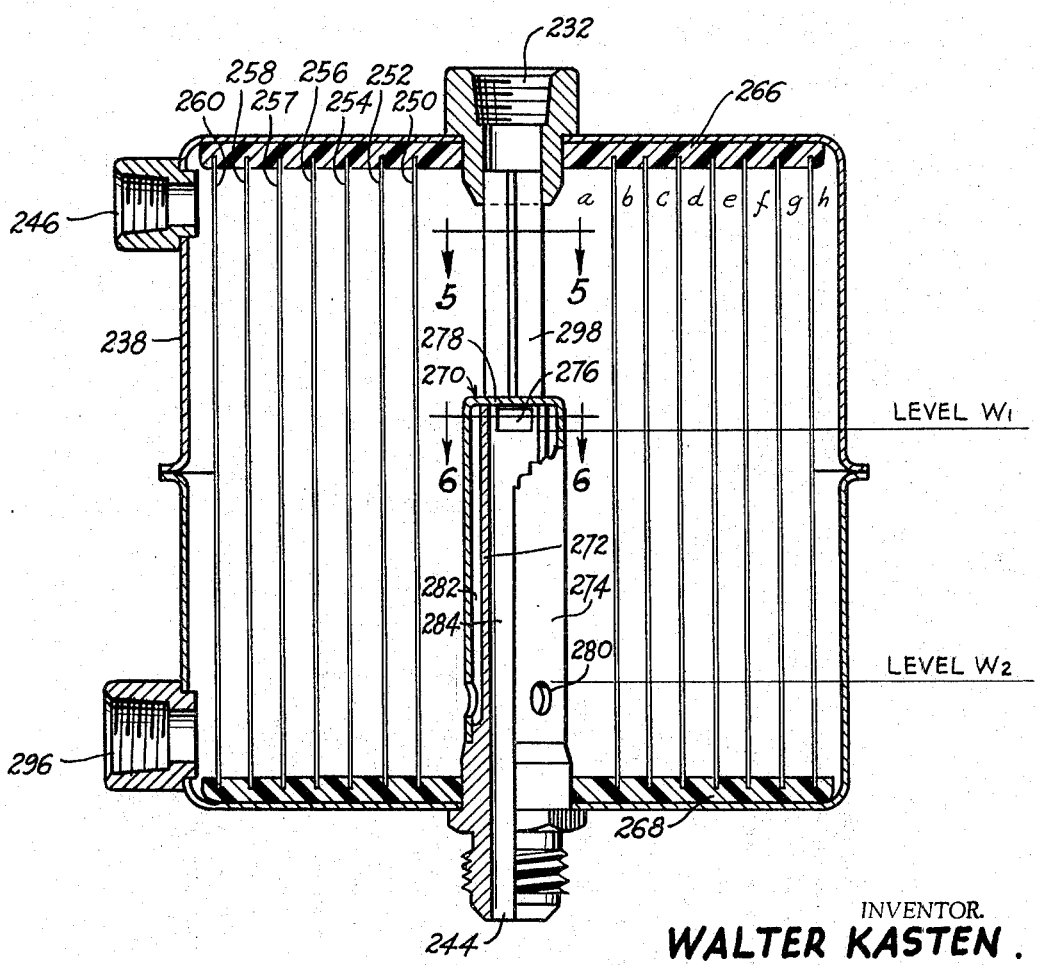
FIG_4
INVENTOR.
WALTER KASTEN.
BY
William N. Antonis
ATTORNEY.

3,297,161
WATER DISCHARGE DEVICE FOR A FUEL
FILTER WATER SEPARATOR
Walter Kasten, Madison Heights, Mich., assignor to The
Bendix Corporation, Madison Heights, Mich., a corporation of Delaware
Filed Jan. 13, 1964, Ser. No. 337,401
14 Claims. (Cl. 210—114)

This invention relates to a water discharge device and more particularly to a water discharge device for use in connection with the sump port of a fuel filter water separator.

It is common knowledge that operators of motor vehicles which utilize internal combustion engines for power plants are faced with the problem of supplying clean water free fuel to the power plant. If multifuel or diesel power plants are used, this problem becomes considerably more critical. These latter power plants do not use carburetors, but use fuel injection pumps having close fitting pistons and small clearances between various moving parts. In such systems, fuel is forced under very high pressures through the relatively small orifices of the fuel injection nozzles into the combustion chamber. If any solid and/or water contaminants are present in the fuel, such contaminants will cause rapid wear of moving parts and abrasion of the small orifices in the fuel injection system.

Although most fuel, which is piped into fuel tanks, is relatively free of solid and/or water contaminants, it is still possible for such contamination to get into such tanks. For example, such contamination could occur during the filling of fuel tanks in dusty air or during rainy weather. In addition, water can enter fuel tanks as a result of condensation during temperature changes. Even with suitable piping precautions it has been found that up to ten percent (10%) water can accumulate in fuel tanks from the aforementioned and other occurrences.

In order to eliminate solid and water contamination from such fuel, various types of effective fuel filters and filter water separators have been developed. These devices can readily trap and separate the solid and water contaminants from the fuel and prevent these contaminants from getting into the fuel injection system. While it is relatively simple to eliminate water and solid contaminants from fuel through use of a filter water separator when only small percentages of water are encountered, it becomes a problem to dispose of such water from the filter water separator sump if large percentages of water are present. For example, a modern tank may have a fuel tank capacity of 400 gallons and, if only two percent (2%) of the capacity is water, the filter-separator would be required to trap eight (8) gallons of water. Since the total volume of fuel filters used for this purpose seldom exceeds more than a fraction of one (1) gallon and the sump capacity is rarely larger than one (1) quart, it of course is impractical to contain eight (8) gallons of water in the sump.

Various types of float mechanisms have been utilized in an effort to discharge the water periodically as it accumulates in the sump. While most of these float mechanisms operate satisfactorily in stationary locations, no practical float mechanism has ever been developed which will function satisfactorily when installed in a military vehicle which must travel in cross country operation, up and down steep slopes, and over rough terrain.

Capacitance type probes in conjunction with electrical solenoid valves have also been used in place of float type devices. However, these are very costly, require complicated electrical circuits, and are not fool-proof since the sensor probes occasionally become coated with waxes and detergents due to the "lacy" interface layer between the fuel and water levels.

Accordingly, it is an object of this invention to provide a floatless water discharge device which will satisfactorily separate water from fuel and will remove it from the sump of a fuel filter water separator unit in a simple and economical manner.

Another object of this invention is to provide a floatless water discharge device which can be operatively connected to the sump port of a fuel filter water separator for separating coalesced water from fuel, discharging the water, and returning the fuel to the fuel tanks.

A further object of this invention is to provide a floatless water discharge device of the type described which utilizes no moving parts and consequently is not subject to wear or decrease in efficiency.

A still further object of this invention is to provide a water discharge device for use with the sump port of a fuel filter water separator which can be made and marketed as a complete component requiring no modifications in existing fuel tanks or vehicle components.

Another object of this invention is to provide a water discharge device for use with the sump port of a fuel filter water separator which utilizes hydrophobic barriers to separate coalesced water from fuel and two syphon type outlets, one of which will discharge the coalesced water and the other of which will discharge the fuel.

More particularly, it is an object of this invention to provide a water discharge device for receiving coalesced water and/or fuel from the sump port of a fuel filter water separator unit which includes a plurality of hydrophobic partition means for separating the fluid received from the sump port into a volume of water and a separate volume of fuel, first syphon means operatively connected to the volume of water for continuously discharging water from the device after the volume of water has risen to a first predetermined level and until said water subsides to a second lower predetermined level, and second syphon means operatively connected to the volume of fuel for continuously discharging fuel from the device after the fuel has risen to a first predetermined level and until the fuel subsides to a second lower predetermined level.

The above and other objects and features of the invention will become apparent from the following description of the device taken in connection with the accompanying drawings which form a part of this specification and in which:

FIGURE 1 is a schematic illustration of a typical fuel storage and dispensing system in which the invention is utilized;

FIGURE 2 is a sectional view of the novel water discharge device which is utilized in the system shown in FIGURE 1;

FIGURE 3 is a sectional view, taken along line 3—3 of FIGURE 2;

FIGURE 4 is a sectional view of another embodiment of the novel water discharge device;

FIGURE 5 is a sectional view taken along line 5—5 of FIGURE 4;

FIGURE 6 is a sectional view taken along line 6—6 of FIGURE 4; and

FIGURES 7 and 8 show additional arrangements of the hydrophobic partition members utilized in the water discharging device.

Referring to FIGURE 1, it will be seen that the invention is shown in connection with a typical fuel storage and dispensing system which includes a fuel storage tank 10, a suitable pump 12, a fuel filter water separator unit 14 of the type shown in application Serial No. 335,545, now abandoned, or in U.S. Patent No. 2,864,505, and the novel water discharge device 16 with which this invention is concerned. The fuel storage tank 10, which is utilized for supplying fuel to the separator unit 14, includes a fill port 18, a discharge port 20, and a return port 22. A fuel line 24 communicates the discharge port 20 of the tank with the inlet port 26 of the fuel filter water separator unit 14. The fuel filter water separator also includes an outlet port 28 which can be suitably connected to an engine, and a sump port 30 which is suitably connected to the inlet port 32 of the water discharge device 16 via sump line 34. The sump line is equipped with a capillary type restrictor 36 or other suitable means which will limit the flow of fluid therethrough so that only a portion of the total flow passing through the fuel filter water separator unit is passed through the water discharge device 16 via sump port 30. The proportion of the fluid to be returned via the sump line 34 in this manner depends upon the maximum amount of water expected in the fuel. Thus, for example, if it is suspected that the fuel may contain as much as ten percent (10%) water, the restrictor would be so proportioned as to direct ninety percent (90%) of the flow through the fuel filter water separator outlet port 28 and ten percent (10%) through the fuel filter water separator sump port 30. If there is any likelihood that the water in the filter separator sump or return line might freeze, the restrictor could be proportioned so that the percentage of the flow returned to the fuel tank via the sump port would be such that the fuel returned through the sump port would exceed the maximum water concentration suspected or encountered in the fuel.

The water discharge device 16, which is shown in FIGURES 2 and 3 includes a housing 38 having the previously mentioned inlet port 32 which receives the coalesced water and/or fuel from the sump port 30 of the fuel filter water separator unit, at least three equally spaced fuel outlet ports 40 which are connected by return line 42 to the return port 22 of the fuel tank, a coalesced water drain port 44, and an air vent 46 which is connected to the top of the conventionally vented fuel tank 10 via line 48.

The water discharge housing 38 is divided into a number of separate compartments a, b, c, d, e, f, g, h, and i by means of porous hydrophobic concentric partitions or cylinders 50, 52, 54, 56, 58, 60, 62 and 64. These hydrophobic partitions or barriers may be formed of fine weave Teflon coated screen or other suitable porous material which will permit flow of fuel therethrough, but which will prevent the flow of coalesced water therethrough. These screens can be molded into two endplates 66 and 68 consisting of neoprene or some other fuel resistant plastic, as shown in the drawing, or could be cemented into metal endcaps.

The innermost cylindrical screen 50 should be of a permeability which will prevent the passage of coalesced water at a head of about one-half inch (½″) water and each of the other hydrophobic screens should have progressively a slightly lower permeability. Thus, hydrophobic screen 54 should have a lower permeability than hydrophobic screen 52, and screen 56 a lower permeability than screen 54, etc. If Teflon coated screens are utilized as the hydrophobic barriers, this progressive reduction in permeability could be accomplished by using a 90 mesh screen for cylinder 50, a 100 mesh screen for cylinder 52, a 110 mesh screen for cylinder 54, etc. Another manner of accomplishing this same effect is to utilize the same basic screen mesh for each of the cylindrical partitions with the permeability being regulated by the thickness of the Teflon coating. Thus, by progressively increasing the thickness of the Teflon coating for each of the screens, it is possible to reduce the effective pore size. A third method of varying the permeability is to increase the diameter of the screen wires for the different cylinders.

As an alternate to the sole use of non-pleated cylindrical screens, corrugated (pleated) screen formed into cylinders could also be used alone, or in combination with the non-pleated screens, as shown in FIGURE 7, wherein the non-pleated Teflon coated screens are designated by the numerals 160, 162 and 164 and the pleated Teflon coated screens are designated by the numerals 161 and 163. This type of configuration increases the surface area, divides the separate annuluses into many smaller volumes, reduces the tendency of splashing when the housing is shaken, and prevents the coalesced water from re-emulsifying with the fuel. Instead of pleated Teflon coated screens, perforated non-hydrophobic pleated splash baffle members 171 and 173 could be utilized, as shown in FIGURE 8, if the additional hydrophobic surface area is not required.

Located in the center chamber or compartment "a" is a water syphon mechanism 70 which includes a tubular member 72 and a second concentric tubular member 74. The tubular member 72 has an opening 76 at the upper end thereof and is suitably connected to the water drain port 44 at the lower end thereof. On the other hand, the second concentric tubular member 74 has a closed upper end 78 and an opening 80 at the lower end thereof which is spaced from the bottom of housing 38. It will be understood by those skilled in the art that this syphon mechanism 70 is simply a variation of the classical syphon wherein a pipe or tube is bent to form two branches or legs of unequal effective length so that a liquid can be transferred to a lower level, over an intermediate elevation, by the pressure of the atmosphere in forcing the liquid up the shorter branch of the pipe immersed in it, while the excess of weight of the liquid in the longer branch (when once filled) causes a continuous flow. Such flow will take place only when the discharging extremity is lower than the liquid surface, and when no part of the pipe is higher above the surface than the same liquid will rise by atmospheric pressure. At sea level, this would be about 33 feet for water and 30 inches for mercury.

Thus, in connection with the water syphon mechanism 70, it will be seen that the shorter branch of the syphon water passage means is formed by the space 82 between the two concentric tubular members 72 and 74 and that the longer branch of the syphon water passage means is formed by the bore 84 of tubular member 72.

With respect to the fuel syphon mechanism 86, which is located along the outer periphery of the housing 38, it will be seen that the space 88 formed between the inner wall or baffle 90 and the outer wall 92 of the housing 38 constitutes the shorter branch of the syphon fuel passage means and the tubular pipe 94 which is connected to the fuel outlet port 40 constitutes the longer branch of the syphon fuel passage means.

Under actual operating conditions the water discharge device may be subjected to the following conditions: (a) The filter separator sump discharge may be 100% coalesced water; (b) The filter separator sump discharge may be 100% fuel; or (c) The filter separator sump discharge may be a mixture of fuel and water of variable ratios between conditions (a) or (b). In probably 99.99% of its operation, the device will be subjected to operating condition (c) and most of the time the percentage of coalesced water in the fuel from the filter separator sump will be less than 10%.

Under condition (c), the fuel-water mixture will enter the cylindrical component or chamber "a." The fuel in the mixture will pas readily through all of the hydrophobic cylindrical barriers 50 through 64, as shown, will rise a first predetermined level $F_1$ and return to the fuel tank through the syphon action of fuel outlet 40 until the fuel subsides to a second lower predetermined level $F_2$. The average level of the fuel will vary between levels $F_1$ and $F_2$ and will correspond approximately to the minimum water level $W_2$.

The coalesced water droplets in the fuel will be retained by the hydrophobic partition 50 in compartment "a" until the level of water has risen to the height where the "break through" force will exceed the surface tension of the hydrophobic barrier. If there were no liquid in compartment "b," the water level in compartment "a" would rise about one-half inch (½") before it would break through hydrophobic barrier 50 and flow into compartment "b." However, as indicated, there will most likely be fuel in compartment "b." This will permit the water level in compartment "a" to rise at least one-half inch (½") above the fuel level in compartment "b." When this occurs, the water will overcome the break through resistance of the hydrophobic cylinder 50 and part of the water will flow into compartment "b" until a level is reached exceeding five-eighths inch (⅝") higher than the fuel level in compartment "c"; the higher level resulting from the fact that hydrophobic cylinder 52 has a lower permeability than hydrophobic cylinder 50. This particular process will continue until the water level in compartment "a" has risen to a first predetermined level $W_1$, which is the top of the water discharge syphon tube 72, at which time water will be discharged through drain port 44 until the water subsides to a second lower predetermined level $W_2$. Since each successive hydrophobic cylinder, from the outside to the inside, is the greater permeability, the water in the annulus between each two adjoining hydrophobic cylinders will flow more readily in direction of the water outlet. The fuel on top of the water levels in the different annuluses will assist in forcing the water through the center outlet syphon.

In the event that condition "a" should ever occur and only 100% water flows into the device 16, then each successive barrier, as designed will allow the water level in the center compartment to rise approximately one-half inch (½") before break through. Since, in the particular design disclosed, there are eight (8) hydrophobic barriers, as shown in FIGURES 2 and 3, the water level could rise at least four inches (4") before it would reach the bottom of baffle 90 in compartment "i" or about six inches (6") before the top of the fuel outlet syphon is reached. Inasmuch as the top of the water outlet syphon is only three inches (3") high, the water would be effectively discharged before ever having a chance to reach the fuel outlet. It will be understood by those skilled in the art that by varying the number of hydrophobic barriers and the permeability thereof that the various critical water and/or fuel levels could likewise be varied.

In the event that 100% fuel enters the device, then the fuel levels in all the compartments "a" through "i" will be substantially equal, since the hydrophobic barriers 50 through 64 will offer practically no resistance to the filtered fuel. After the fuel has reached the first predetermined level $F_1$, it will be syphoned down until the fuel subsides to the second predetermined level $F_2$. It should be noted that the low levels of the water discharge and fuel outlet syphons are such that there is a difference in level of "x" amount. This dimension can vary depending on the specific design, the number and type of hydrophobic barriers, viscosity of the fuel, and other variables. In all cases, however, the dimension "x" must be positive so as to assure that no fuel is discharged through the water outlet 44 even if 100% fuel without any water enters inlet port 32 of the device.

It will be understood that a minimum of three (3) equally spaced fuel outlets 40 are desirable in order to permit proper operation of the device in the event it is tilted off the vertical. Furthermore, while it is advantageous to use hydrophobic barriers with varying degrees of permeability, it is not essential for the functioning of this device. Still further, a mixture of different mediae could be used for the different diameter hydrophobic cylinders. For example, the innermost cylinder or cylinders could be made of Teflon coated screens, and the outermost cylinders could be cylindrical ribbon type elements with Teflon strips therebetween, as disclosed in my copending patent application Serial No. 219,685, now Patent No. 3,189,182. In addition, while the device shown and described is cylindrically shaped, this shape is not essential for the operation of the device. The device could just as well be square, rectangular, or any other desired shape.

The embodiment shown in FIGURES 4, 5, and 6, wherein like parts are indicated by like numerals plus 200, differs basically from the FIGURE 2 embodiment in that the fuel syphon means has been eliminated and the fuel outlet 296 is located at the bottom of the outermost compartment. This is a much simpler arrangement and would be adequate for many applications, particularly those where the quantity of water in the fuel is rather low and the added advantage of the fuel outlet syphon is not needed. The principal advantage of the fuel outlet syphon is that it allows the level of the fuel to build up periodically so as to wet the screen cylinders with fuel. A fuel wetted barrier is much more efficient in preventing the water from passing through the barrier than a non-fuel wetted barrier. Another difference in this embodiment is the utilization of an anti-splash baffle 298, shown in section in FIGURE 5 and located between the inlet port 232 and the top of the water syphon mechanism 270. The water syphon mechanism, although somewhat structurally different, functions in the same manner between the levels $W_1$ and $W_2$, as in the FIGURE 2 embodiment. Another alternate arrangement which might be appropriate for certain applications would be to also delete the water outlet syphon and use only a center standpipe with a cap to prevent splashing of fuel into the outlet pipe.

The several practical advantages which flow from my water discharge device are believed to be obvious from the above, and other advantages may suggest themselves to those who are familiar with the art to which this invention relates.

Furthermore, although my invention has been described in connection with certain specific embodiments, it will be obvious to those skilled in the art that various changes may be made in the form, structure, and arrangement of components without departing from the spirit of the invention. Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, porous hydrophobic partition means located in said housing and interposed between said inlet port and fuel outlet port for separating said housing into first and second chamber means, said first chamber means communicating with said inlet and water drain ports and being on the upstream side of said partition means and the second chamber means communicating with said fuel outlet port and being on the downstream side of said partition means, said porous hydrophobic partition means being characterized in that fuel located in said first chamber means is permitted to flow therethrough into said second chamber means whereas coalesced water in said first chamber means is prevented from flowing therethrough to said second chamber means, first means located in said first chamber means for discharging water from said first chamber means via said water drain port when said water has risen to a predetermined level, and second means located in said second chamber means for discharging fuel from said second chamber means via said fuel outlet port when said fuel has risen to a predetermined level.

2. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, means located in said housing for separating the fluid therein into a volume of water and a separate volume of fuel, first syphon means operatively connected only to said volume of water for continuously discharging water via said water drain port after the volume of water has risen to a first predetermined level and until said water subsides to a second lower predetermined level, and second syphon means operatively connected only to said volume of fuel for continuously discharging fuel via said fuel outlet port after said fuel has risen to a first predetermined level and until said fuel subsides to a second lower predetermined level.

3. A water discharge device, as defined in claim 2, wherein said first and second syphon means each include passage means having two connected substantially vertical branches of unequal effective length, the longer of which in the first syphon means is connected to the water drain port and in the second syphon means is connected to the fuel outlet port, and the shorter of which in both the first and second syphon means is spaced from the bottom of said housing, said shorter branch of the passage means in the first syphon means being open to the volume of water and in the second syphon means being open to the volume of fuel.

4. A water discharge device, as defined in claim 3, wherein the first predetermined water level is determined by the position of the highest portion of the passage means of said first syphon means and the second predetermined water level is determined by the position of the open end of the shorter branch of the passage means in the first syphon means, and the first predetermined fuel level is determined by the position of the highest portion of the passage means of said second syphon means and the second predetermined fuel level is determined by the position of the open end of the shorter branch of the passage means in the second syphon means.

5. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, porous hydrophobic barrier means located in said housing and interposed between said inlet port and fuel outlet port for separating said housing into first and second chamber means, said first chamber means communicating with said inlet and water drain ports and being on the upstream side of said barrier means and the second chamber means communicating with said fuel outlet port and being on the downstream side of said barrier means, said porous hydrophobic barrier means being characterized in that fuel located in said first chamber means is permitted to flow therethrough into said second chamber means whereas coalesced water in said first chamber means is prevented from flowing therethrough to said second chamber means, first syphon means operatively connected to said first chamber means for continuously discharging water from said first chamber means via said water drain port after said water has risen to a first predetermined level and until said water subsides to a second lower predetermined level, and second syphon means operatively connected to said second chamber means for continuously discharging fuel from said second chamber means via said fuel outlet port after said fuel has risen to a first predetermined level and until said fuel subsides to a second lower predetermined level.

6. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, a plurality of porous hydrophobic partition members located in said housing and interposed between said inlet port and fuel outlet port, said inlet and water drain ports being on the upstream side of all of said partition members and said fuel outlet port being on the downstream side of all of said partition members, said porous hydrophobic partition members being characterized in that fuel is permitted to flow therethrough to said fuel outlet port whereas coalesced water is prevented from flowing therethrough to said fuel outlet port, first syphon means operatively connected to said housing and located upstream of all of said hydrophobic partition members for continuously discharging water from said housing via said water drain port after said water has risen to a first predetermined level and until said water subsides to a second lower predetermined level, and second syphon means operatively connected to said housing and located downstream of all of said hydrophobic partition members for continuously discharging fuel from said housing via said fuel outlet port after said fuel has risen to a first predetermined level and until said fuel subsides to a second lower predetermined level.

7. A water discharge device, as defined in claim 6, wherein the plurality of porous hydrophobic partition members are formed of fine wire mesh screen coated with a material having an affinity for fuel but an aversion for water.

8. A water discharge device, as defined in claim 7, wherein the porous hydrophobic partition members are separated by porous pleated baffle members.

9. A water discharge device, as defined in claim 8, wherein the porous pleated baffle members are formed of fine wire mesh screen coated with a material having an affinity for fuel but an aversion for water.

10. A water discharge device for receiving coalesced water and/or fuel from the sump port of a fuel filter water separator unit comprising a housing having an inlet port operatively connected to said sump port for receiving the flow therefrom, fuel outlet port means and a coalesced water drain port, porous hydrophobic partition means located in said housing and interposed between said inlet port and fuel outlet port for separating said housing into first and second chamber means, said first chamber means communicating with said inlet and water drain ports and being on the upstream side of said partition means and the second chamber means communicating with said fuel outlet port means and being on the downstream side of said partition means, said porous hydrophobic barrier means being characterized in that fuel located in said first chamber means is permitted to flow therethrough into said second chamber means whereas coalesced water in said first chamber means is prevented from flowing therethrough to said second chamber means, first syphon means located in said first chamber means for continuously discharging water from said first chamber means via said water drain port after said water has risen to a first predetermined level and until said water subsides to a second lower predetermined level, said first syphon means including water passage means having two connected substantially vertical branches of unequal effective length, the longer of which is connected to the water drain port and the shorter of which is spaced from the bottom of said housing and is open to the fluid in said first chamber means, said first predetermined water level being determined by the position of the highest portion of said water passage means and said second lower predetermined water level being determined by the position of the open end of the shorter branch of said water passage means, and second syphon means operatively connected to said second chamber means for continuously discharging fuel from said second chamber means via said fuel outlet port means after said fuel has risen to a first predetermined level and until said fuel subsides to a second lower predetermined level, said second syphon means including fuel passage means having two connected substantially vertical branches of unequal effective length, the longer of which is connected to the fuel outlet port and the shorter of which is spaced from the bottom of said housing and is open to the fluid in said second chamber means, said first predetermined fuel level being determined by the position of the highest portion of said fuel passage means and said second lower predetermined fuel level being determined by the position of the open end of the shorter branch of said fuel passage means.

11. A water discharge device, as defined in claim 10, wherein said first syphon means includes a first tubular member having opening means located at the upper end thereof and having the lower end thereof communicating with said drain port to form the longer branch of said water passage means, and a second concentric tubular member having a closed upper end and having opening means located at the lower end thereof to form the shorter branch of said water passage means between said tubular members, and said second syphon means includes an inner and outer housing wall having a space therebetween which constitutes the shorter branch of said fuel passage means, said inner wall being spaced from the bottom of the housing, and tubular means connected to the space between said inner and outer walls and to said fuel outlet port means for forming the longer branch of said fuel passage means.

12. A water discharge device, as defined in claim 11, wherein a plurality of equally spaced tubular means are connected to the space between said inner and outer walls and to said fuel outlet port means.

13. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, means located in said housing for separating the fluid therein into a volume of water and a separate volume of fuel, syphon means operatively connected to said volume of water for continuously discharging water via said water drain port after the volume of water has risen to a first predetermined level and until said water subsides to a second lower predetermined level, said syphon means including water passage means having two connected substantially vertical branches of unequal effective length, the longer of which is connected to the water drain port and the shorter of which is spaced from the bottom of said housing and is open to said volume of water, said first predetermined water level being determined by the position of the highest portion of said water passage means and said second lower predetermined water level being determined by the position of the open end of the shorter branch of said water passage means, and means operatively connected to said volume of fuel for discharging fuel via said fuel outlet port when said fuel has risen to a predetermined level.

14. A water discharge device, as defined in claim 13, wherein the longer vertical branch of the water syphon passage is formed by a first tubular member which has the lower end thereof communicating with said drain port and has opening means located at the upper end thereof, and the shorter vertical branch of the water syphon passage is formed with said first tubular member by a concentric second tubular member which is closed at the upper end thereof and has opening means at the lower end thereof.

References Cited by the Examiner

UNITED STATES PATENTS

| | | | |
|---|---|---|---|
| 1,711,428 | 4/1929 | Schafer | 210—112 X |
| 2,624,462 | 1/1953 | Williams | 210—115 X |
| 3,181,700 | 5/1965 | Hesson | 210—532 X |

FOREIGN PATENTS

| | | |
|---|---|---|
| 4,703 | 1899 | Great Britain. |

REUBEN FRIEDMAN, *Primary Examiner.*

D. M. RIESS, *Assistant Examiner.*